United States Patent
Kruglick (10) Patent No.: US 9,021,509 B1
(45) Date of Patent: Apr. 28, 2015

(54) DATACENTER MANAGED THREAD AND MULTI-PROCESSING SUPPORT

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 29 days.

(21) Appl. No.: 14/114,524

(22) PCT Filed: Apr. 24, 2013

(86) PCT No.: PCT/US2013/038088
§ 371 (c)(1),
(2) Date: Oct. 28, 2013

(87) PCT Pub. No.: WO2014/175883
PCT Pub. Date: Oct. 30, 2014

(51) Int. Cl.
*G06F 13/00* (2006.01)
*G06F 9/455* (2006.01)
*G06F 9/54* (2006.01)

(52) U.S. Cl.
CPC .............. *G06F 9/45533* (2013.01); *G06F 9/54* (2013.01)

(58) Field of Classification Search
CPC .............................. G06F 9/45533; G06F 9/541
USPC ................................................ 719/328; 718/1
See application file for complete search history.

(56) References Cited

U.S. PATENT DOCUMENTS

| 8,261,295 | B1* | 9/2012 | Risbood et al. ................ 719/328 |
| 2004/0249601 | A1 | 12/2004 | Circenis |
| 2005/0120160 | A1 | 6/2005 | Plouffe et al. |
| 2011/0185355 | A1 | 7/2011 | Chawla et al. |
| 2011/0197065 | A1 | 8/2011 | Stauth et al. |
| 2013/0298119 | A1* | 11/2013 | Hsu et al. .......................... 718/1 |

OTHER PUBLICATIONS

"A cross-platform process and system utilities module for Python"; https://code.google.com/p/psutil/, Psutil, Created on Jan. 27, 2009, retrieved on Oct. 20, 2013.
"Amazon Elastic Compute Cloud (Amazon EC2)"; http://aws.amazon.com/ec2/, Amazon Web Services, retrieved on Oct. 20, 2013.
"For a single Application Pool, how many Worker Processes should be allowed to run?"; http://stackoverflow.com/questions/5268319/for-a-single-application-pool-how-many-worker-processes-should-be-allowed-to-ru, Stack Overflow, retrieved on Oct. 20, 2013.
"Multicore Association"; http://en.wikipedia.org/wiki/Multicore_Association, Wikipedia, created on Jul. 22, 2008, retrieved on Oct. 20, 2013.

(Continued)

*Primary Examiner* — Andy Ho
(74) *Attorney, Agent, or Firm* — Turk IP Law, LLC (57) ABSTRACT

Technologies are generally described for datacenter managed thread and multi-processing support. In some examples, a system may be provided for dynamic core allotment and provisioning within a server such that resources can be efficiently used to accomplish available work during lulls shorter than inter-server balancing time scales. A virtual machine manger (VMM) may enact core level provisioning and make optimal performance multi-processing information available via a virtual application programming interface (API) handler that receives and responds to messages sent to the VMM. The messages may not need to reach an external network and may therefore be exchanged at high speeds.

23 Claims, 6 Drawing Sheets (56) References Cited

OTHER PUBLICATIONS

"16.6. Multiprocessing—Process-based "threading" interface"; http://docs.python.org/2/library/multiprocessing.html, pp. 1-58, retrieved on Oct. 20, 2013.
Ahmad, et al, "Semi-Distributed Load Balancing for Massively Parallel Multicomputer Systems", IEEE Transactions on Software Engineering, vol. 17, No. 10, Oct. 1991.
Dadhania, "Gang scheduling in CFS"; http://lwn.net/Articles/472797/, Created on Dec. 19, 2011, retrieved on Oct. 20, 2013.
Drummonds, "Co-scheduling SMP VMs in VMware ESX Server", https://communities.vmware.com/docs/DOC-4960, VMware Communities, Created on May 2, 2008, retrieved on Oct. 20, 2013.
Imamura et al. "Optimizing Power-Performance Trade-off for Parallel Applications through Dynamic Core and Frequency Scaling"; http://www.dcs.gla.ac.uk/conferences/resolve12/papers/session2_paper2.pdf, pp. 1-8, Published on Feb. 7, 2012.
International Search Report and Written Opinion for PCT/US13/38088, filed Apr. 24, 2013 mailed Sep. 6, 2013.
"Multicore Resource Management API Working Group (MRAPI)", http://www.multicore-association.org/workgroup/mrapi.php, The Multicore Association, retrieved on Oct. 20, 2013.
"Multicore Virtualization Working Group (MVWG™)" ;http://www.multicore-association.org/workgroup/mvwg.php, Multicore Association, retrieved on Oct. 20, 2013.
Liao et al., "Dynamic Core Provisioning for Quantitative Differentiated Services", IEEE Transactions on Networking, vol. 12, Issue 3, pp. 429-442, Jun. 2004.
Ahn et al., "Dynamic Virtual Machine Scheduling in Clouds for Architectural Shared Resources", Proceedings of the 4th USENIX Conference on Hot Topics in Cloud Computing, May 2012.
Fedorova et al., "Cypress: A Scheduling Infrastructure for a Many-Core Hypervisor", In Proceedings of the 1st Workshop on Managed Many-Core Systems, published on May 2006.
Hu et al., I/O Scheduling Model of Virtual Machine Based on Multicore Dynamic Partitioning, HPDC '10 Proceedings of the 19th ACM International Symposium on High Performance Distributed Computing, pp. 142-154, Jun. 20-25, 2010.

\* cited by examiner

DATACENTER MANAGED THREAD AND MULTI-PROCESSING SUPPORT

This Application is the National Stage filing under 35 U.S.C. §371 of PCT Application Ser. No. PCT/US13/38088 filed on Apr. 24, 2013. The PCT Application is herein incorporated by reference in its entirety.

BACKGROUND

Unless otherwise indicated herein, the materials described in this section are not prior art to the claims in this application and are not admitted to be prior art by inclusion in this section.

Datacenter service level agreements (SLAs) typically deal in "equivalent" computing units. While some datacenters may specify how many virtual cores they are issuing to a customer, true co-scheduling may typically be available only if the underlying hardware is not shared. Despite the fact that not all of the cores are available at the same time or at the same utilization rate, datacenters may be unable to effectively increase a particular customer's core count and decrease another one's when demand makes it appropriate because changing core counts may have unpredictable effects.

From the programming side, having more cores available may mean to a customer that they need to perform more multicore processing. Running too many processes on too few cores, however, may generate too many swaps and memory spaces, potentially impeding performance. Thus, greater datacenter utilization (reachable by allotting more cores to each customer while having the cores less predictably available) may be directly opposed to efficient application programming. There is a strong trend in conventional virtualized core systems to increase process counts and moderate penalty for overpopulating the cores. This trend suggests that a typical application may face optimization pressures toward larger numbers of processes to take advantage of temporarily available virtualized cores and may pay a performance penalty if all virtualized cores are not available.

SUMMARY

The present disclosure generally describes techniques for dynamic core allotment and provisioning within a server so that resources can efficiently be used to accomplish available work during lulls shorter than inter-server balancing time scales.

According to some examples, methods for dynamic core allotment and provisioning within a server are described. An example method may include virtualizing access to a plurality of cores in a server for a plurality of virtual machines and providing local core-level provisioning to the virtual machines by providing optimal performance multi-processing information via a virtual application programming interface (API) handler to the virtual machines.

According to other examples, a server for dynamic core allotment and provisioning within a datacenter is described. An example server may include a memory configured to store instructions and a processor coupled to the memory. The processor may execute a plurality of virtual machines and a virtual machine manager (VMM), where the VMM may be configured to virtualize access to a plurality of cores in the server for the virtual machines and provide local core-level provisioning to the virtual machines. The VMM may provide local core-level provisioning by providing optimal performance multi-processing information via a virtual API handler to the virtual machines.

According to further examples, a cloud-based datacenter configured to provide dynamic core allotment and provisioning is described. An example datacenter may include at least one virtual machine (VM) operable to be executed on one or more physical machines and a datacenter controller operable to execute a virtual machine manager (VMM). The VMM may virtualize access to a plurality of cores in the server for the virtual machines and provide local core-level provisioning to the virtual machines in cooperation with a management of the datacenter by providing optimal performance multi-processing information via a virtual API handler to the virtual machines, where the virtual API handler is configured to receive and respond to messages sent to the VMM.

According to some examples, a computer readable storage medium with instructions stored thereon, which when executed on one or more computing devices execute a method for dynamic core allotment and provisioning within a server is described. An example method may include the actions described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to dynamic core allotment and provisioning within a server so that resources can efficiently be used to accomplish available work during lulls shorter than inter-server balancing time scales.

Briefly stated, technologies are generally described for datacenter managed thread and multi-processing support. In some examples, a system may be provided for dynamic core allotment and provisioning within a server such that resources can be efficiently used to accomplish available work during lulls shorter than inter-server balancing time scales. A virtual machine manger (VMM) may enact core level provisioning and make optimal performance multi-processing information available via a virtual application programming interface (API) handler that receives and responds to messages sent to the VMM. The messages may not need to reach an external network and may therefore be exchanged at high speeds.

A datacenter as used herein refers to an entity that hosts services and applications for customers through one or more physical server installations and one or more virtual machines executed in those server installations. Customers of the datacenter, also referred to as tenants, may be organizations that provide access to their services by multiple users. An example datacenter based service configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with conventional configurations, where each service provider would execute their applications and have their users access those applications on the retail services own servers physically located on retail service premises. One result of the networked approach described herein is that customers like the retail service may move their hosted services/applications from one datacenter to another without the users noticing a difference.

Figure 1:
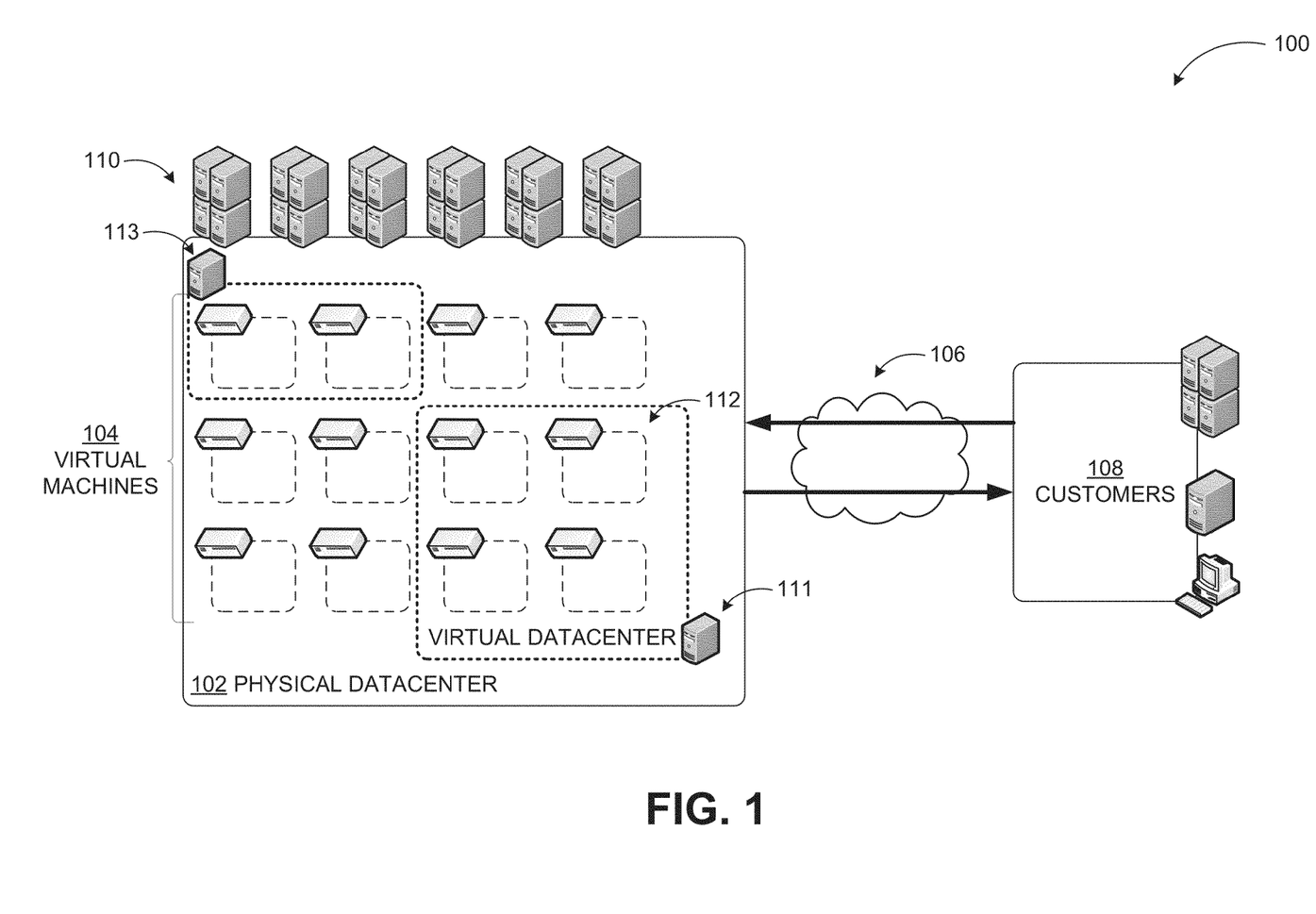
FIG. 1 illustrates an example datacenter-based system where datacenter managed thread and multi-processing support may be implemented.

FIG. 1 illustrates an example datacenter-based system where datacenter managed thread and multi-processing support may be implemented, arranged in accordance with at least some embodiments described herein.

As shown in a diagram 100, a physical datacenter 102 may include one or more physical servers 111 or 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106. Within the physical datacenter there may also be one or more application servers 110 that may deploy application instances to a gateway server. The gateway server may reside at the border of the datacenter and perform actions associated with incoming and outgoing communications.

Hardware virtualization or platform virtualization refers to the creation of a virtual machine that acts like a real computer with an operating system. Programs executed on the virtual machines may be separated from the underlying hardware resources. For example, a server that is running one operating system may host a virtual machine that looks like a server with another operating system. Furthermore, multiple virtual machines may be hosted on a single server giving the appearance of multiple servers. In hardware virtualization, a host machine is the physical machine on which the virtualization takes place, and a guest machine refers to the virtual machine. Different types of hardware virtualization may include (1) full virtualization: almost complete simulation of the actual hardware to allow software, which may typically include a guest operating system, to run unmodified; (2) partial virtualization: some but not all of the target environment may be simulated, where some guest programs may need modifications to run in this virtual environment; (3) para-virtualization: a hardware environment may not be simulated, however, the guest programs may be executed in their own isolated domains, as if they are running on a separate system.

One principle of virtualization is sharing of hardware. Para-virtualized drivers, network virtualizations, memory translation tables, and the like may allow multiple virtual machines to work with logical resources instead of the real ones. Buffers and scheduling may allow efficient usage in such configurations. These models do not extend to processing cores in a multi-processing environment, however. Processes may involve instruction buffers, caches, look-a-heads, and may have to be set up and taken down in an orderly fashion. Conventional applications are typically written to determine the supported process population once and then issue multi-processing to that estimate for the duration of an operation. In conventional systems, virtual machine settings may allow a customer to set the number of cores available to a VM, but typically does not allow the number to be a changing number.

Figure 2:
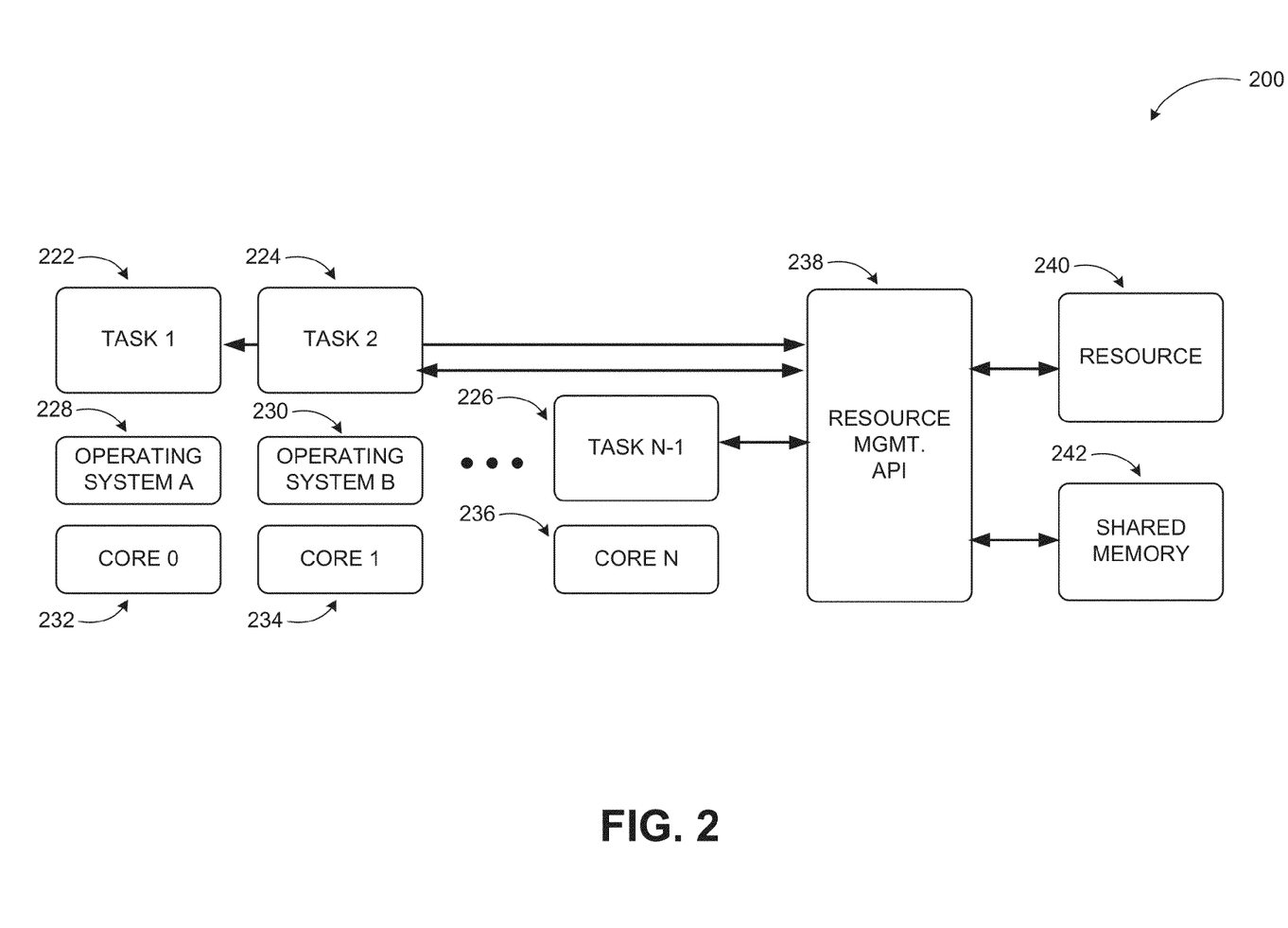
FIG. 2 illustrates an example multicore resource management API system for managing task execution on multiple cores.

FIG. 2 illustrates an example multicore resource management API system for managing task execution on multiple cores, arranged in accordance with at least some embodiments described herein.

A diagram 200 depicts an example system, where any number of cores such as a core 232, a core 234, up to a core 236 may be used to execute multiple tasks such as tasks 222, 224, and 226. The system shown in the diagram 200 may also execute multiple operating systems such as an operating system 228 and an operating system 230. Various tasks may be executed on different operating systems.

In the example multicore resource management system shown in the diagram 200, a resource management API 238 may manage sharing of non-core resources 240 and a shared memory 242 among multiple tasks, each of which may receive exclusive ownership of one or more cores. Standards such as Multicore Resource Management API (MRAPI) may assume that there is no core sharing among the tasks 222, 224, and 226. Other standardized approaches such as Multicore Communications API (MCAPI) may address virtualization of sensors, memory, and other elements, but not the cores.

In a system according to some embodiments, a VMM may enact core level provisioning and make optimal performance multiprocessing information available via a virtual API handler that receives and responds to messages sent to the VMM. The messages may not need to reach an external network and may therefore be exchanged at high speeds. In contrast, conventional worker count optimizations may typically be static and based on assumed fixed core counts. With a suitable number of workers, an application may be provided with additional provisioning flexibility and utilization for a server and datacenter, where short term idle cores may be used to get additional work performed. System efficiency may increase in proportion to core counts.

Figure 3:
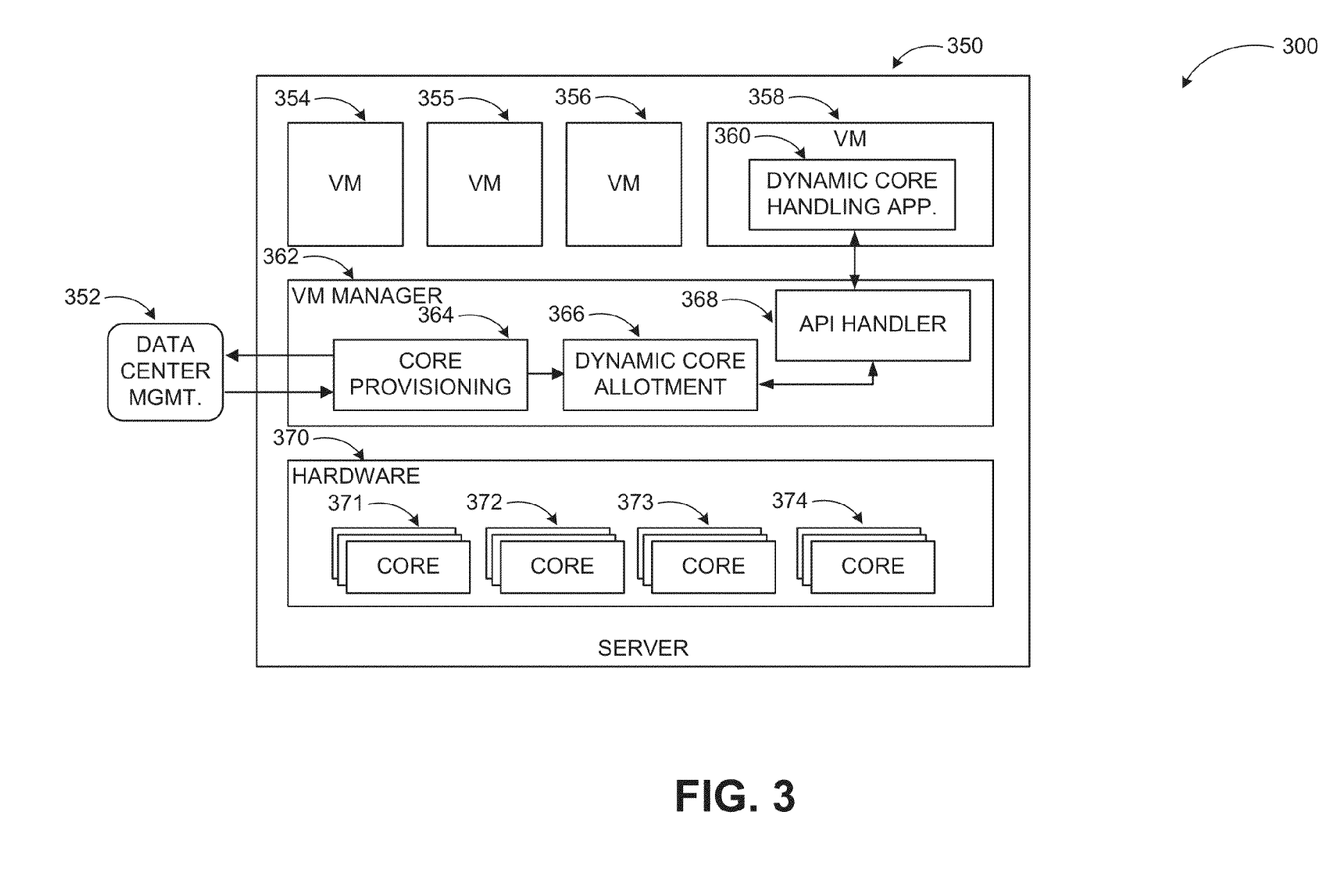
FIG. 3 illustrates the architecture of an example system for datacenter managed thread and multi-processing support.

FIG. 3 illustrates the architecture of an example system for datacenter managed thread and multi-processing support, arranged in accordance with at least some embodiments described herein.

Some embodiments are directed to a VMM or datacenter provisioning system that is configured to conduct dynamic reprovisioning at the core level. Such a system may be realized to the immediate benefit of existing customers by allotting extra cores opportunistically as supplements to existing VMs. As the ecosystem of virtual machines within the datacenters evolves and more applications become capable of handling significant dynamic variation in core counts, SLA and service tiers may focus more on "average core count" instead of absolute core count allowing higher utilization rates while ameliorating the performance penalty for having too many processes when available core count shrinks.

Referring to FIG. 3, as shown in a diagram 300, a series of virtual machines 354, 355, 356, and 358 may be managed by VMM 362 configured to virtualize access to hardware 370 including multiple cores such as cores 371 through 374 inside a server 350. The VMM 362 may perform local core-level provisioning 364 assigning tasks from different VMs to various cores, possibly in cooperation with a datacenter management 352 that may, for example, inform the VMM 362 that the VM 358 has paid to receive "excess" cores as available and agreed to having the excess cores reclaimed by the datacenter management. A warning with a predefined time period prior to reclaiming of the excess cores may be provided by the datacenter management to the VMs that agree to share excess cores. Thus, the core provisioning 364 may commit a dynamic core allotment 366. Application(s) 360 executed on the VM 358 may use API calls when building a multi-processing worker population to request advisement on how many cores are available or how large of a worker population to generate. The API calls may be sent using conventional HTTP protocols and handled at the VMM level. The VMM 362, already virtualizing the network layer for the VM 358, may thus see all requests or have a local network address. Because an API request from the application(s) 360 and an API handler 368 may be on the same hardware, the request may not need to reach the network interface and may operate at system-call speed.

An example system according to some embodiments may use a network API style transaction to obtain the needed information in order to use common programming techniques but the message does not need to go farther than the VMM 362. In other embodiments, the API call mechanism may be replaced with, for example, a virtualized driver that allows a program to request similar information from the VMM 362. By using the net/API channel (existing datacenter application/programming languages may already be using the mechanism), code and infrastructure already in place may be utilized. The core provisioning 364 may also be performed using data that is already typically gathered about core and VM level usage.

In further examples, core availability may be handled by an operating system. The system may be implemented by having the communication be facilitated between the VM 358 operating system and VMM 362. In this scenario, the application(s) 360 may have to monitor the environment using operating system tools.

Handling dynamic core counts may be managed differently by various operating systems, but may generally be managed by setting all the VM operating systems to the largest potential core count and reporting most of the cores nonfunctional or busy when they are not available. For example, some desktop computers may include up to eight cores in their processor(s) while some "cloud-on-a-chip" systems may include up to 50 cores on a single processor. In yet other examples, such nonfunctional or busy states may be rendered detectable to programs within the VM 358 (such as application(s) 360). Thus, the applications may modify worker populations in order to avoid the processing penalty for excess worker overhead. The modification may involve creating a new operating system level signal standard for such events. Such an implementation may include changes to more elements of the ecosystem than the examples discussed above (operating systems, programming libraries, etc.), but may certainly be realized.

The examples in FIGS. 1 through 3 have been described using specific systems and processes in which datacenter managed thread and multi-processing support may be implemented. Embodiments for providing datacenter managed thread and multi-processing support are not limited to the systems and processes according to these examples.

Figure 4:
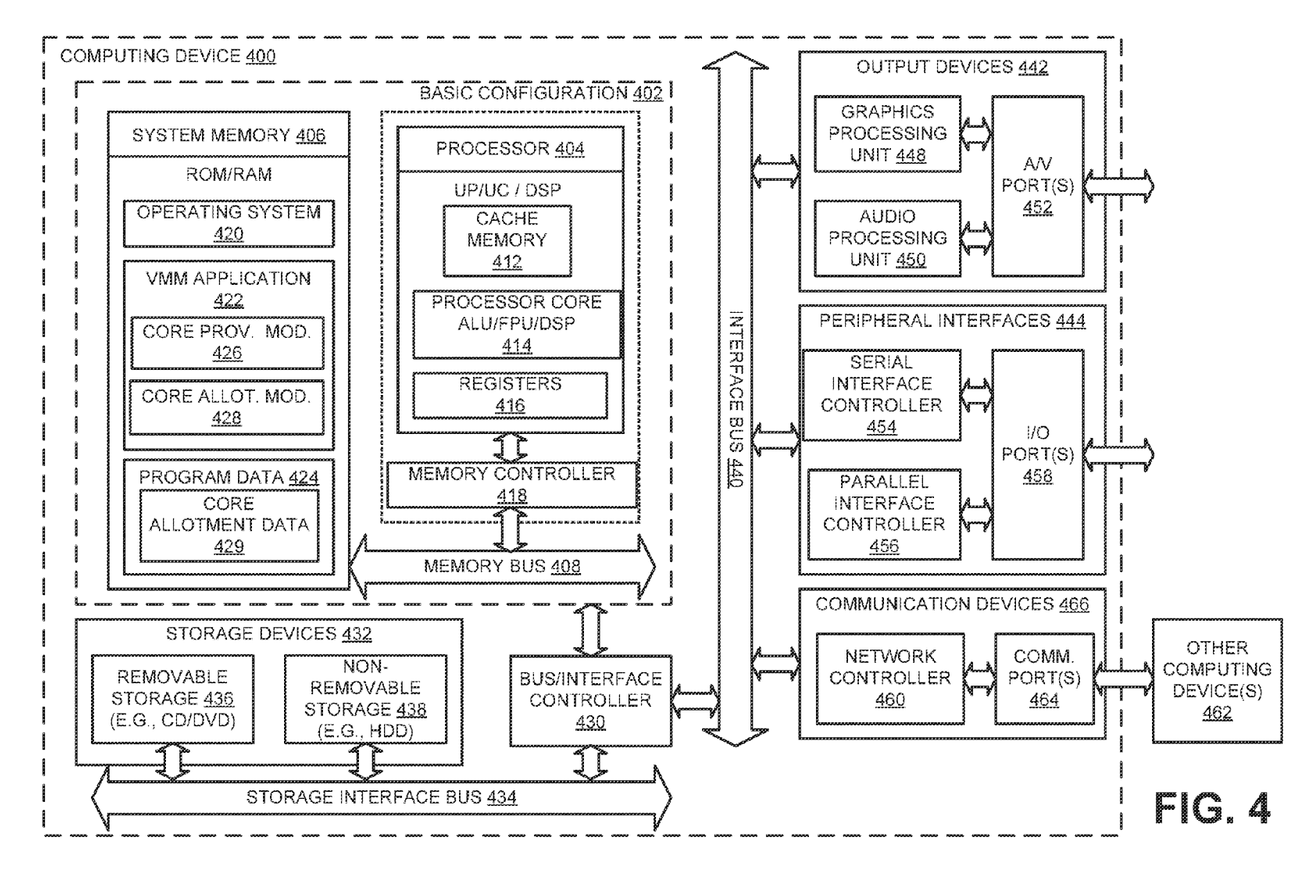
FIG. 4 illustrates a general purpose computing device, which may be used for dynamic core allotment and provisioning within a server so that resources can efficiently be used to accomplish available work during lulls shorter than inter-server balancing time scales.

FIG. 4 illustrates a general purpose computing device 400, which may be used for dynamic core allotment and provisioning within a server so that resources can efficiently be used to accomplish available work during lulls shorter than inter-server balancing time scales, arranged in accordance with at least some embodiments described herein.

For example, the computing device 400 may be a management server data datacenter configured to provide dynamic core allotment and provisioning as described herein. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), microcontroller (µC), a digital signal processor (DSP), or any combination thereof. The processor 404 may include one more levels of caching, such as a level cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, a VMM application 422, and program data 424. The VMM application 422 may include a core provisioning module 426 and a core allotment module 428 to enact core level provisioning and make optimal performance multi-processing information available via a virtual application programming interface (API) handler that receives and responds to messages sent to the VMM application 422. The program data 424 may include, among other data, core allotment data 429 associated with one or more cores of a datacenter, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 466 includes a network controller 460, which may be arranged to facilitate communications with one or more other computing devices 462 over a network communication link via one or more communication ports 464. The one or more other computing devices 462 may include servers, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods for dynamic core allotment and provisioning within a server. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 5:
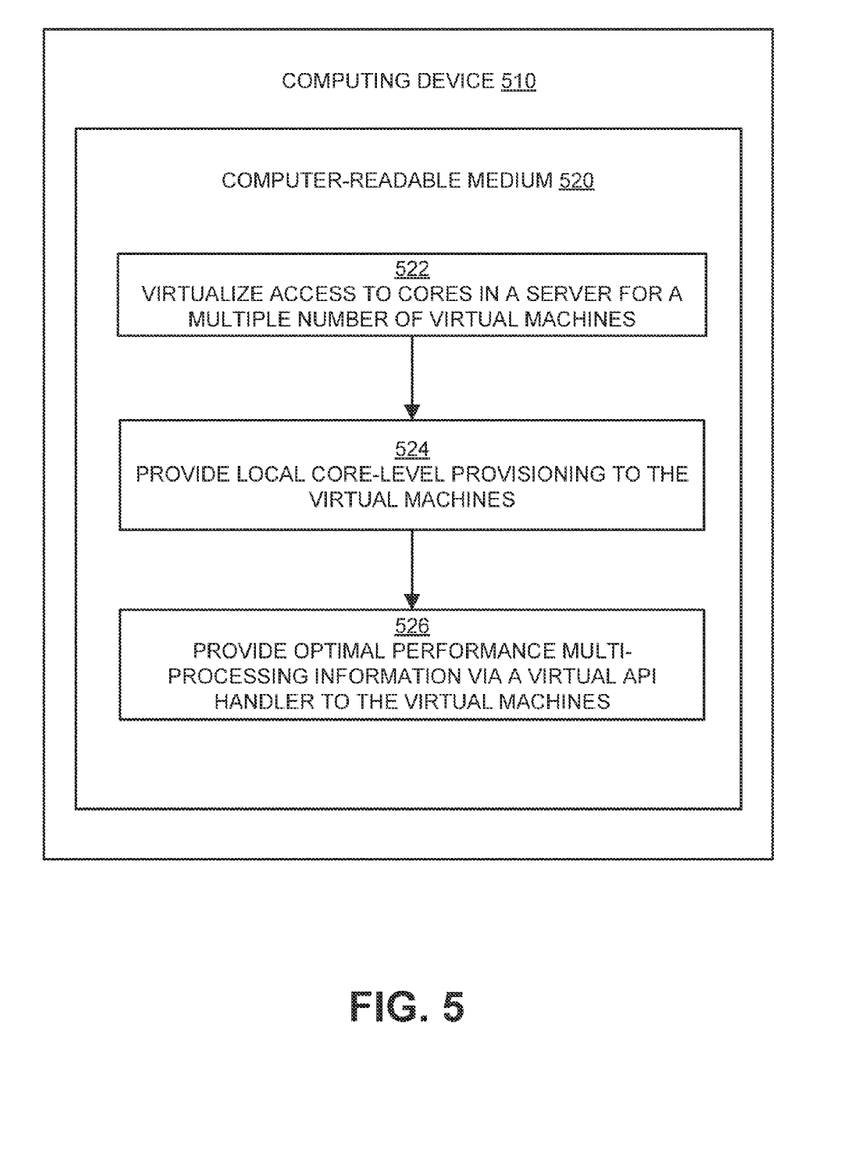
FIG. 5 is a flow diagram illustrating an example method for dynamic core allotment and provisioning within a server that may be performed by a computing device such as the computing device in FIG. 4.

FIG. 5 is a flow diagram illustrating an example method for dynamic core allotment and provisioning within a server that may be performed by a computing device such as the computing device in FIG. 4, arranged in accordance with at least some embodiments described herein.

Example methods may include one or more operations, functions or actions as illustrated by one or more of blocks 522, 524, and 526, and may in some embodiments be performed by a computing device such as the computing device 400 in FIG. 4. The operations described in the blocks 522-526 may also be stored as computer-executable instructions in a computer-readable medium such as a computer-readable medium 520 of a computing device 510.

An example process for providing datacenter managed thread and multi-processing support may begin with block 522, "VIRTUALIZE ACCESS TO CORES IN A SERVER FOR A MULTIPLE NUMBER OF VIRTUAL MACHINES", where the VMM application 422 may enable virtualized access to multiple cores at a server by managing multiple virtual machines on the cores.

Block 522 may be followed by block 524, "PROVIDE LOCAL CORE-LEVEL PROVISIONING TO THE VIRTUAL MACHINES", where the core provisioning module 426 may enact core level provisioning such that resources can be efficiently used to accomplish available work during lulls shorter than inter-server balancing time scales.

Block 524 may be followed by block 526, "PROVIDE OPTIMAL PERFORMANCE MULTI-PROCESSING INFORMATION VIA A VIRTUAL API HANDLER TO THE VIRTUAL MACHINES", where the VMM application 422 may make optimal performance multi-processing information available via a virtual application programming interface (API) handler that receives and responds to messages sent to the VMM. The messages may not need to reach an external network and may therefore be exchanged at high speeds.

Figure 6:
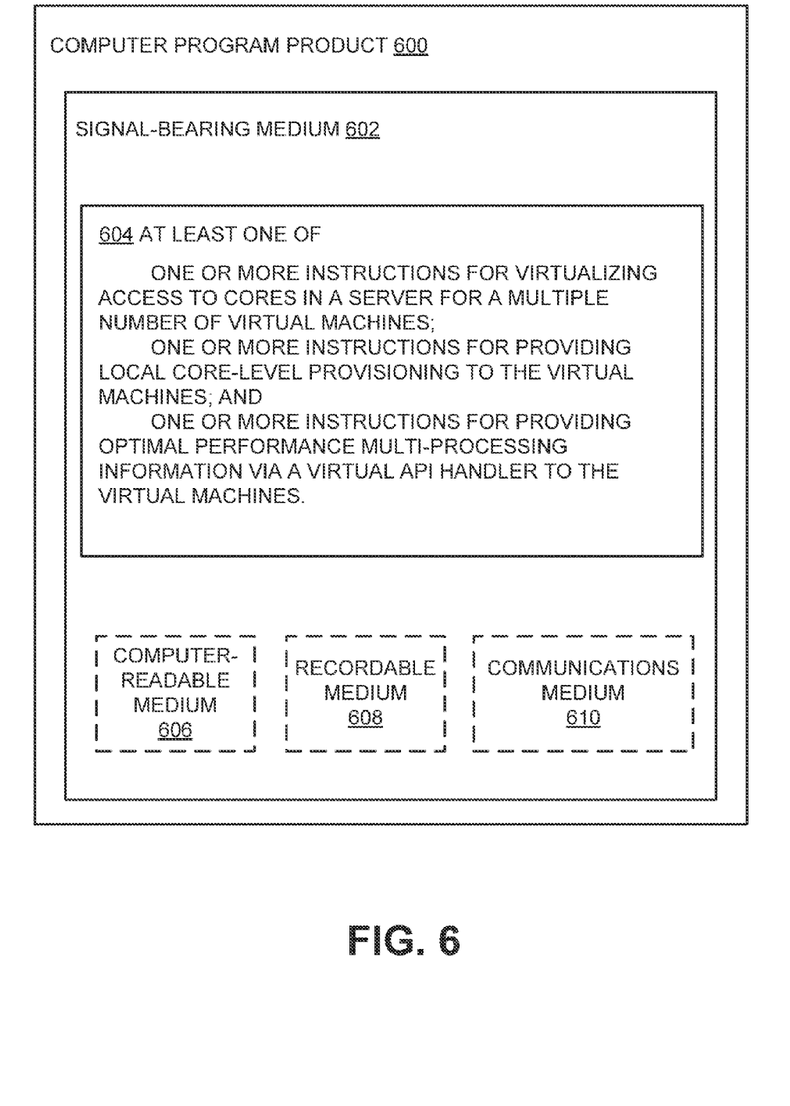
FIG. 6 illustrates a block diagram of an example computer program product, all arranged in accordance with at least some embodiments described herein.

FIG. 6 illustrates a block diagram of an example computer program product, arranged in accordance with at least some embodiments described herein.

In some examples, as shown in FIG. 6, the computer program product 600 may include a signal bearing medium 602 that may also include one or more machine readable instructions 604 that, when executed by, for example, a processor, may provide the functionality described herein. Thus, for example, referring to the processor 404 in FIG. 4, the core provisioning module 426 and the core allotment module 428 may undertake one or more of the tasks shown in FIG. 6 in response to the instructions 604 conveyed to the processor 404 by the medium 602 to perform actions associated with providing datacenter managed thread and multi-processing support as described herein. Some of those instructions may include, for example, virtualizing access to cores in a server for a multiple number of virtual machines, providing local core-level provisioning to the virtual machines, and providing optimal performance multi-processing information via a virtual API handler to the virtual machines, according to some embodiments described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (for example, a fiber optic cable, a waveguide, a wired communications link, a wireless communication link, etc). Thus, for example, the program product 600 may be conveyed to one or more modules of the processor 604 by an RF signal bearing medium, where the signal bearing medium 602 is conveyed by the wireless communications medium 610 (for example, a wireless communications medium conforming with the IEEE 802.11 standard).

According to some examples, methods for dynamic core allotment and provisioning within a server may be described. An example method may include virtualizing access to a plurality of cores in a server for a plurality of virtual machines and providing local core-level provisioning to the virtual machines by providing optimal performance multi-processing information via a virtual application programming interface (API) handler to the virtual machines.

According to other examples, the virtual API handler may receive and respond to messages sent to a virtual machine manager providing the local core-level provisioning. Providing the local core-level provisioning to the virtual machines may be performed in cooperation with a management of a datacenter hosting the virtual machines. The method may further include enabling applications executed on the virtual machines to use API calls when building a multi-processing worker population to request input for one or more of a number of available cores or a size of a worker population to generate.

According to further examples, the method may also include enabling the applications to use HTTP protocol for the API calls. The API calls may be handled at a virtual machine manager level. The method may further include enabling the applications to use virtualized drivers to communicate with a virtual machine manager. An API request from the applications and the virtual API handler may be on the same server operating at system-call speed. The method may also include performing the local core-level provisioning using data that is gathered about core and virtual machine level usage.

According to yet other examples, communication associated with the optimal performance multi-processing information may be exchanged between a virtual machine operating system and a virtual machine manager. The method may further include handling dynamic core counts by setting virtual machine operating systems to a largest potential core count and reporting a majority of the virtual machine operating systems in one of a nonfunctional state or a busy state. The method may also include rendering one of the nonfunctional or the busy state to be detectable to one or more applications within each virtual machine.

According to other examples, a server for dynamic core allotment and provisioning within a datacenter may be described. An example server may include a memory configured to store instructions and a processor coupled to the memory. The processor may execute a plurality of virtual machines and a virtual machine manager (VMM), where the VMM may be configured to virtualize access to a plurality of cores in the server for the virtual machines and provide local core-level provisioning to the virtual machines. The VMM may provide local core-level provisioning by providing optimal performance multi-processing information via a virtual API handler to the virtual machines.

According to some examples, the virtual API handler may be configured to receive and respond to messages sent to the VMM providing the local core-level provisioning. The VMM may be configured to provide the local core-level provisioning to the virtual machines in cooperation with a management of the datacenter. The VMM may be further configured to enable applications executed on the virtual machines to use API calls when building a multi-processing worker population to request input for one or more of a number of available cores or a size of a worker population to generate.

According to further examples, the VMM may be further configured to enable the applications to use HTTP protocol for the API calls. The API calls may be handled at a virtual machine manager level. The VMM may be further configured to enable the applications to use virtualized drivers to communicate with the VMM. An API request from the applications and the virtual API handler may be on the server operating at system-call speed.

According to yet other examples, the VMM may be further configured to perform the local core-level provisioning using data that is gathered about core and virtual machine level usage. Communication associated with the optimal performance multi-processing information may be exchanged between a virtual machine operating system and the VMM. The VMM may be further configured to handle dynamic core counts by setting virtual machine operating systems to a largest potential core count and reporting a majority of the virtual machine operating systems in one of a nonfunctional state or a busy state.

According to further examples, a cloud-based datacenter configured to provide dynamic core allotment and provisioning may be described. An example datacenter may include at least one virtual machine (VM) operable to be executed on one or more physical machines and a datacenter controller operable to execute a virtual machine manager (VMM). The VMM may virtualize access to a plurality of cores in the server for the virtual machines and provide local core-level provisioning to the virtual machines in cooperation with a management of the datacenter by providing optimal performance multi-processing information via a virtual API handler to the virtual machines, where the virtual API handler is configured to receive and respond to messages sent to the VMM.

According to yet other examples, the VMM may be further configured to enable applications executed on the virtual machines to use API calls when building a multi-processing worker population to request input for one or more of a number of available cores or a size of a worker population to generate. The API calls may be handled at a virtual machine manager level. The VMM may also be configured to handle dynamic core counts by setting virtual machine operating systems to a largest potential core count and reporting a majority of the virtual machine operating systems in one of a nonfunctional state or a busy state.

According to some examples, a computer readable storage medium with instructions stored thereon, which when executed on one or more computing devices execute a method for dynamic core allotment and provisioning within a server may be described. An example method may include the actions described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (for example, a fiber optic cable, waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors for moving and/or adjusting components and/or quantities).

A system may be implemented using any suitable commercially available components, such as those typically found in data computing/communication and/or network computing/ communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to dynamically allot and provision cores within a server, the method comprising:
    virtualizing access to a plurality of cores in a server for a plurality of virtual machines; and
    providing local core-level provisioning to the virtual machines by:
        providing optimal performance multi-processing information via a virtual application programming interface (API) handler to the virtual machines; and
        enabling applications executed on the virtual machines to use API calls when building a multi-processing worker population to request input for one or more of a number of available cores or a size of a worker population to generate.

2. The method of claim 1, wherein the virtual API handler receives and responds to messages sent to a virtual machine manager providing the local core-level provisioning.

3. The method of claim 1, wherein providing the local core-level provisioning to the virtual machines is performed in cooperation with a management of a datacenter hosting the virtual machines.

4. The method of claim 1, further comprising enabling the applications executed on the virtual machines to use HTTP protocol for the API calls.

5. The method of claim 1, further comprising enabling the applications executed on the virtual machines to use virtualized drivers to communicate with a virtual machine manager.

6. The method of claim 1, wherein an API request from the applications executed on the virtual machines and the virtual API handler are on the same server operating at system-call speed.

7. The method of claim 1, further comprising performing the local core-level provisioning using data that is gathered about core and virtual machine level usage.

8. The method of claim 1, wherein communication associated with the optimal performance multi-processing information is exchanged between a virtual machine operating system and a virtual machine manager.

9. The method of claim 1, further comprising handling dynamic core counts by setting virtual machine operating systems to a largest potential core count and reporting a majority of the virtual machine operating systems in one of a nonfunctional state or a busy state.

10. The method of claim 9, further comprising rendering one of the nonfunctional or the busy state to be detectable to one or more applications within each virtual machine.

11. A server to dynamically allot and provision cores within a datacenter, the server comprising:
    a memory configured to store instructions; and
    a processor coupled to the memory, wherein the processor is configured to execute a plurality of virtual machines and a virtual machine manager (VMM) configured to:
        virtualize access to a plurality of cores in the server for the virtual machines; and
        to provide local core-level provisioning to the virtual machines:

provide optimal performance multi-processing information via a virtual API handler to the virtual machines; and enable applications executed on the virtual machines to use API calls when building a multi-processing worker population to request input for one or more of a number of available cores or a size of a worker population to generate.

12. The server of claim 11, wherein the virtual API handler is configured to receive and respond to messages sent to the VMM providing the local core-level provisioning.

13. The server of claim 11, wherein the VMM is configured to provide the local core-level provisioning to the virtual machines in cooperation with a management of the datacenter.

14. The server of claim 11, wherein the VMM is further configured to enable the applications executed on the virtual machines to use HTTP protocol for the API calls.

15. The server of claim 14, wherein the API calls are handled at a virtual machine manager level.

16. The server of claim 11, wherein the VMM is further configured to enable the applications executed on the virtual machines to use virtualized drivers to communicate with the VMM.

17. The server of claim 11, wherein an API request from the applications executed on the virtual machines and the virtual API handler are on the server operating at system-call speed.

18. The server of claim 11, wherein the VMM is further configured to perform the local core-level provisioning using data that is gathered about core and virtual machine level usage.

19. The server of claim 11, wherein communication associated with the optimal performance multi-processing information is exchanged between a virtual machine operating system and the VMM.

20. The server of claim 11, wherein the VMM is further configured to handle dynamic core counts by setting virtual machine operating systems to a largest potential core count and reporting a majority of the virtual machine operating systems in one of a nonfunctional state or a busy state.

21. A cloud-based datacenter configured to provide dynamic core allotment and provisioning, the datacenter comprising:

at least one virtual machine (VM) operable to be executed on one or more physical machines, and a datacenter controller operable to execute a virtual machine manager (VMM), wherein the VMM is configured to:

virtualize access to a plurality of cores in a server for the virtual machines; and to provide local core-level provisioning to the virtual machines in cooperation with a management of the datacenter:

provide optimal performance multi-processing information via a virtual API handler to the virtual machines, wherein the virtual API handler is configured to receive and respond to messages sent to the VMM; and enable applications executed on the virtual machines to use API calls when building a multi-processing worker population to request input for one or more of a number of available cores or a size of a worker population to generate.

22. The datacenter of claim 21, wherein the API calls are handled at a virtual machine manager level.

23. The datacenter of claim 21, wherein the VMM is further configured to handle dynamic core counts by setting virtual machine operating systems to a largest potential core count and reporting a majority of the virtual machine operating systems in one of a nonfunctional state or a busy state.

\* \* \* \* \*

UNITED STATES PATENT AND TRADEMARK OFFICE
CERTIFICATE OF CORRECTION

PATENT NO.        : 9,021,509 B1                                Page 1 of 1
APPLICATION NO.   : 14/114524
DATED             : April 28, 2015
INVENTOR(S)       : Kruglick It is certified that error appears in the above-identified patent and that said Letters Patent is hereby corrected as shown below:

In the specification

In Column 1, Lines 4-5, delete "35 U.S.C. §371" and insert -- 35 U.S.C. § 371 --, therefor.

In Column 5, Line 29, delete "VMM 362" and insert -- a VMM 362 --, therefor.

In Column 6, Line 46, delete "microcontroller (μC)," and insert -- a microcontroller (μC), --, therefor.

In Column 12, Line 20, delete "waveguide," and insert -- a waveguide, --, therefor.

Signed and Sealed this
Twentieth Day of October, 2015

Michelle K. Lee
*Director of the United States Patent and Trademark Office*